US012293679B2

(12) United States Patent
Reiner

(10) Patent No.: US 12,293,679 B2
(45) Date of Patent: May 6, 2025

(54) RETRACTABLE BANNER STANCHION ASSEMBLY

(71) Applicant: Andrew Eric Reiner, Park City, UT (US)

(72) Inventor: Andrew Eric Reiner, Park City, UT (US)

(*) Notice: Subject to any disclaimer, the term of this patent is extended or adjusted under 35 U.S.C. 154(b) by 0 days.

(21) Appl. No.: 18/403,147

(22) Filed: Jan. 3, 2024

(65) Prior Publication Data

US 2024/0194100 A1 Jun. 13, 2024

Related U.S. Application Data

(63) Continuation of application No. 17/087,908, filed on Nov. 3, 2020, now Pat. No. 11,900,834.

(51) Int. Cl.
*G09F 13/00* (2006.01)
*G09F 15/00* (2006.01)
*G09F 17/00* (2006.01)

(52) U.S. Cl.
CPC ...... *G09F 15/0031* (2013.01); *G09F 15/0037* (2013.01); *G09F 15/0062* (2013.01); *G09F 17/00* (2013.01)

(58) Field of Classification Search
CPC ..... E06B 9/08; E06B 9/18; E06B 9/40; E06B 9/0692; E06B 2009/002; E06B 2009/543; E06B 9/54; A47G 5/00; A47G 5/02; E01F 13/00; E01F 13/028; E01F 13/022; E01F 13/02; E04F 15/003; E04F 15/005; E04F 10/0685
USPC .................. 40/514–517; 160/24, 351, 26, 29
See application file for complete search history.

(56) References Cited

U.S. PATENT DOCUMENTS 193,573 A * 7/1877 Tripp ........................ A47G 5/02 160/122
1,163,310 A * 12/1915 Beckley ................ G09F 11/325 40/516
1,705,190 A * 3/1929 Kincheloe .............. A47B 97/02 40/516
5,549,129 A * 8/1996 Becker ................ E04F 10/0681 135/88.13
6,874,559 B1 * 4/2005 Hicks .................. E04F 10/0685 160/22
7,178,790 B2 * 2/2007 de Lorenzo ........... E01F 13/028 49/34
9,598,896 B1 * 3/2017 Pichik ........................ E06B 9/13
9,714,491 B2 * 7/2017 Wettern ................ E01F 13/022
10,422,091 B1 * 9/2019 Moir ........................ E04H 17/20
11,337,418 B2 * 5/2022 Pichik .................... E04H 15/001
2006/0131551 A1 * 6/2006 Hopp ..................... E01F 13/028 256/21
2008/0121352 A1 * 5/2008 Cheng ........................ E06B 9/08 160/238

(Continued)

FOREIGN PATENT DOCUMENTS

GB 2368365 A * 5/2002 ............... E06B 7/28

*Primary Examiner* — Cassandra Davis
(74) *Attorney, Agent, or Firm* — BranchMark, PLC

(57) ABSTRACT

A support structure for a retractable banner housing assembly comprising a rotatable elongate mounting rod that may be directly or indirectly affixed to a flexible banner, the support structure having a base member and a positioning member supported by the base member to orient the housing assembly in a desired upright position.

2 Claims, 9 Drawing Sheets

(56) References Cited

U.S. PATENT DOCUMENTS

| | | | | |
|---|---|---|---|---|
| 2010/0044661 | A1* | 2/2010 | Weiner | E04H 12/2215 256/1 |
| 2018/0044868 | A1* | 2/2018 | Miller | E01F 13/028 |
| 2019/0063018 | A1* | 2/2019 | Reiner | B65H 75/4471 |
| 2021/0008440 | A1* | 1/2021 | Anders | A63B 71/022 |

* cited by examiner

RETRACTABLE BANNER STANCHION ASSEMBLY

CROSS-REFERENCE TO RELATED APPLICATIONS

This application is a continuation of pending application Ser. No. 17/087,908, which is a continuation-in-part of application Ser. No. 29/724,190 filed Feb. 13, 2020, which is a continuation-in-part of application Ser. No. 16/131,676 filed Sep. 14, 2018 (U.S. Pat. No. 10,794,022, issued Oct. 6, 2020), which is a continuation-in-part of application Ser. No. 15/201,665 filed Jul. 5, 2016 (U.S. Pat. No. 10,100,574, issued Oct. 16, 2018), which is a continuation-in-part of application Ser. No. 15/083,757 filed Mar. 29, 2016 (U.S. Pat. No. 10,094,166, issued Oct. 9, 2018), which specifications are all incorporated herein in their entirety by reference hereto.

TECHNICAL FIELD

This invention relates generally to portable, non-anchored, self-supporting, retractable, and interconnectable, banners, gates, screens, partitions, and the like for defining pathways in private and public spaces both indoors and outdoors, guiding and routing persons through such pathways, inhibiting undesired ingress to and egress from such pathways, and where applicable, providing pre-printed messaging including, for example, visual guidance for appropriate or suggested spacing of persons for health or safety.

BACKGROUND ART

Removable gates, particularly child and pet safety gates, are well known in the art for use in preventing access to residential areas considered unsafe or undesirable for children or pets. Conventional gates characteristically comprise a plurality of cooperating gate sections that are generally horizontally extensible and retractable within specific selected narrow entryways such as between doorjambs, opposed walls, balustrade uprights, and the like. These safety gates are commonly provided on ends thereof with compressible buffer stops comprising elastomeric material or other suitable spring mechanisms, which when compressed and then released, function to effectively set the corresponding gate or gate sections against displacement between the respective opposed fixed extremes defined by the entryways. Additional safety laches and the like have been used to further secure the relative positions of the corresponding gate sections and prevent inadvertent or undesired disengagement of the same following installation.

To remove the aforementioned safety gates after installation, the safety laches, if any, must first be disabled or released whereupon the buffer stops may be compressed (generally by applying lateral pressure to the same) to temporarily relieve applied tension on the opposed fixed extremes of the corresponding entryways. The gate sections may then be sufficiently retracted for the gate or gate system to be removed. Removable child and pet safety gates of the type described above are commonly used in residential environments solely to prevent access to specific living or working areas such as kitchens, stairways, basements, garages, and the like. They are characteristically anchored and not self-supporting. Such child and safety gates are similarly not designed or intended to be interconnected to define corresponding pathways, let alone to guide or route persons there through, to inhibit undesired ingress to or egress from such defined pathways, or to provide pre-printed signage such as visual guidance for appropriate or suggested spacing of persons.

Removable gates have similarly been used in retail and warehouse environments to temporarily prevent access to selected service and work areas such as shopping aisles, check-out aisles and the like, as may be defined, for example, by shelving and storage racks such as pallet rack systems and assemblies. As those skilled in the art will recognize, conventional pallet rack systems typically comprise a plurality of support posts for receiving corresponding horizontal connecting lengths and vertically spaced horizontal rack beams. Each support post generally comprises a single piece of metal having an outwardly faced or facing post section or margin, parallel side post sections or margins, and an opposed terminal end section or margin defining a substantially square or rectangular post cross section. The outwardly facing post sections and parallel post sections are each typically provided with multiple rows of vertically spaced pairs of keyhole slots or other suitable stamped apertures. The slots in each pair are often angularly related to one another to allow a better fit for components being attached to the pallet rack, including the above referenced rack beams. Such pallet rack storage systems are well known to those skilled in the art and are referenced and described in substantial detail in U.S. Pat. Nos. 10,094,166 and 10,100,574. See also Canadian Patent No. CA2233760 issued to Secure-Plast, Inc.; U.S. Pat. No. 5,170,829 issued to Duncan et al.; U.S. Pat. No. 5,636,679 issued to Miller et al.; U.S. Pat. No. 6,056,038 issued to Foster et al.; U.S. Pat. No. 6,435,250 issued to Pichik et al.; U.S. Pat. No. 6,575,435 issued to Tracy A. Kotzen; U.S. Pat. No. 6,688,480 issued to David S. Denny; U.S. Pat. No. 6,807,999 issued to Bowen et al.; U.S. Pat. No. 7,207,370 issued to Snyder et al.; U.S. Pat. No. 7,219,709 issued to John Williams; U.S. Pat. No. 7,237,591 issued to Snyder et al.; U.S. Pat. No. 7,337,822 issued to Snyder et al.; U.S. Pat. No. 7,384,017 issued to Burke et al.; U.S. Pat. No. 8,087,443 issued to Snyder et al.; U.S. Pat. No. 8,490,668 issued to Snyder et al.; U.S. Pat. No. 8,991,470 issued to Steven A. Pacheco; U.S. Pat. No. 9,334,670 issued to Cowie, U.S. Patent Publication No. 2015190001 filed by Floersch et al.; U.S. Patent Publication No. 20050098770 filed by Ronald Allan Schell; U.S. Patent Publication No. 20050211389 filed by Snyder et al et al.; U.S. Patent Publication No. 20060076544 filed by William M. Kurple; U.S. Patent Publication No. 20060113519 filed by Ian James Prismall; U.S. Patent Publication No. 20060151123 filed by Chandler et al.; U.S. Patent Publication No. 20060191644 filed by Snyder et al.; U.S. Patent Publication No. 20060213626 filed by Snyder et al.; U.S. Patent Publication No. 20090008042 filed by Snyder et al.; and International Patent Application WO9713049 filed by Edwin Hardy. Like the aforementioned child safety and pet gates, these removable gates, including retractable pallet storage system gates, are characteristically anchored and not self-supporting. They are not designed or intended to be interconnected to define corresponding pathways, let alone to guide or route persons there through, to inhibit undesired ingress to or egress from such defined pathways, or to provide pre-printed signage such as visual guidance for appropriate or suggested spacing of persons for health or safety.

Pole top retractable tapes have been used in public and private waiting areas and queues such as transportation centers (airports, train stations, bus stations, etc.), museums, event centers (theatres, concert halls, etc.), ticket offices, and the like, for specific traffic control purposes. A typical such pole top retractable tape generally comprises a small top cap affixed or affixable to an upright stanchion supported by a weighted base and having an extensible and retractable tape or belt. See, for example, U.S. Pat. No. 6,338,450 issued to Schwendinger; U.S. Pat. No. 5,507,446 issued to Ditzig; U.S. Pat. No. 5,421,530 issued to Bertagna; U.S. Pat. No. 5,117,859 issued to Carlson; U.S. Pat. No. 4,844,420 issued to Oster; U.S. Pat. No. 4,186,912 issued to Byre, Jr.; U.S. Pat. No. 4,124,196 issued to Hipskind; U.S. Pat. No. 3,917,231 issued to Find; U.S. Pat. Nos. 3,839,824; 3,880,405 issued to Brueske; U.S. Pat. No. 3,220,464 issued to Wise; U.S. Pat. No. 3,688,440 issued to Appelgarth et al.; U.S. Pat. Nos. 2,961,255; 535,141; 376,436 issued to Harrison, U.S. Pat. Nos. 354,450, and 193,573. While retractable tapes may be suitable for the particular purposes to which they address, they are not suitable for the purpose of the present invention as heretofore described. Namely, as indicated above, these top mounted extensible tapes are directed principally to guiding and routing persons along predetermined designated pathways. They structurally cannot and do not prohibit ingress or egress therefrom, as persons can readily climb over or duck under the corresponding tapes. Such tapes are similarly of insufficient width to permit any meaningful pre-printed signage including one or more advertising or public or private messages including suggesting spacing of persons. Still further, these prior art cap and tape type stanchions are insufficient to permit retrofitting the same with wider belts as their mechanical designs fail to address, let alone resolve, winding issues known to occur in larger retractable gates wherein typical tacky or "rubber" materials or textures become bound or "bunched up" during extension and/or retraction creating barriers to both operation and installation.

Various retractable gates and barriers have been proposed for use in preventing access to specified work and recreation areas such as pools and the like and to define enclosures. See, for example, U.S. Pat. No. 6,733,204 issued to Paniccia; U.S. Pat. No. 7,207,370 issued to Snyder; U.S. Pat. No. 7,219,709 issued to Williams; U.S. Pat. No. 8,887,441 issued to Lundh, U.S. Pat. No. 9,334,670 issued to Cowie; U.S. Patent Application Publication No. 2007/0119998 to Mechling; U.S. Patent Application Publication No. 2010/0301296 to Ratzenberger; U.S. Patent Application Publication No. 2012/0256149 to Sylvester; and International Publication Number WO 97/13049 to Hardy. Again, such gates and barriers are all characteristically anchored and not self-supporting.

Accordingly, there is a need for a portable, non-anchored support structure for positioning a retractable banner assembly and selectively deploying the assembly on a walking surface as determined by a user. The support structure should permit the interconnection of a plurality of such assemblies and/or support structures and should be readily operable for its intended purpose of defining pathways in private and public spaces both indoors and outdoors, guiding and routing persons through such pathways, inhibiting undesired ingress to and egress from such pathways, and where applicable, providing pre-printed private or public messaging including visual guidance for appropriate or suggested spacing of persons for health and safety, all while overcoming the aforementioned prior art functional issues of "bunching up" upon extension or retraction of the banners thereof.

There is similarly a need for a portable, non-anchored, self-supporting, retractable banner stanchion assembly for selective placement by a user on a walking surface. The assembly should dispose both a stanchion and a housing each in an upright position substantially normal to the walking surface whereupon a flexible banner may be extended to couple to one or more external attachment points. The retractable banner assembly should permit the interconnection of multiple such assemblies and be readily operable for its intended purpose of defining pathways in private and public spaces both indoors and outdoors, guiding and routing persons through such pathways, inhibiting undesired ingress to and egress from such pathways, and where applicable, providing pre-printed private or public messaging including visual guidance for appropriate or suggested spacing of persons, all while overcoming the aforementioned prior art functional issues of "bunching up" upon extension or retraction of the banners thereof.

DISCLOSURE OF INVENTION

It is a principle object of the present invention to provide a portable, non-anchored support structure for positioning a retractable banner assembly and selectively deploying the assembly on a walking surface in a desired position relative thereto.

It is a further object of the present invention to provide such a portable, non-anchored support structure having a base member, and a stanchion supported by the base member in an upright position substantially normal to the walking surface, wherein the stanchion similarly positions the retractable banner assembly in an upright position substantially normal to the walking surface.

It is yet a further object of the present invention to provide a portable, non-anchored, self-supporting, retractable banner stanchion assembly for selective placement by a user on a walking surface in a desired position relative thereto, wherein the assembly includes a stanchion, a base member supporting and disposing the stanchion relative to the walking surface, and a housing positioned by the stanchion and similarly disposed relative to the walking surface.

Still further, it is an object of the present invention to provide such a portable non-anchored support structure and/or retractable banner stanchion assembly, wherein the assembly is rotatable.

It is still further an object of the present invention to provide such a portable non-anchored support structure and/or retractable banner stanchion assembly, wherein the retractable banner is flexible and comprised of material or materials having a modulus of elasticity sufficiently high such that the foregoing has sufficient stiffness to inhibit binding or "bunching up" during extension and/or retraction thereof.

In carrying out these and other objects, features, and advantages of the present invention, there is provided a portable, non-anchored, support structure for positioning at least one retractable banner assembly and selectively deploying the assembly on a walking surface in a desired position relative thereto. The support structure comprises a base member and a stanchion supported by the base member preferably, but not necessarily, in an upright position substantially normal to the walking surface. The stanchion positions the retractable banner assembly in a desired position relative to the walking surface which similarly is preferably, but not necessarily, in an upright position substantially normal to the walking surface. The assembly is preferably, but not necessarily, rotatable and may be affixable to the stanchion by one or more brackets. In one preferred, but not required embodiment, the assembly comprises a housing having a first end, a first end cap affixable to the first end, a second end, and a second end cap affixable to the second end. The support structure may further comprise a top bracket affixable to the stanchion for receiving the first end cap, and a bottom bracket affixable to the base for receiving the second end cap. In this one preferred but not required embodiment, the top and bottom brackets dispose the housing in the upright position substantially normal to the walking surface or other suitable position and permit the housing to rotate therein.

In further carrying out these and other objects, features, and advantages of the present invention, there is provided a portable, non-anchored, self-supporting, retractable banner stanchion assembly for selective placement by a user on a walking surface. The assembly comprises a stanchion, a base member supporting and disposing the stanchion in a desired position relative thereto, including, but not limited to, an upright position substantially normal to the walking surface, and at least one housing positioned by the stanchion in a desired position including, but not limited to, an upright position substantially normal to the walking surface. In one preferred, but not required embodiment, the housing has a first end, a first end cap affixable to the first end, a second end, and a second end cap affixable to the second end. The assembly further comprises a top bracket affixable to the stanchion for receiving the first end cap, and a bottom bracket affixable to the base for receiving the second end cap. In this one preferred but not required embodiment, the top and bottom brackets dispose the housing in the upright position substantially normal to the walking surface and permit the housing to rotate therein. In a second preferred, but not required embodiment, the housing further comprises a sidewall extending between first and second opposing ends, each end having a corresponding end cap and includes an elongate opening disposed in the sidewall. A rotatable rod is disposed within the housing and is coupled to a trailing edge of a flexible banner. A leading edge of the flexible banner may be coupled to an edge coupler for removably affixing the banner to an external attachment point upon extension of the banner through the elongate opening. The housing further includes a spring coupled to the rotatable rod to exert a force in a direction opposite a direction of extension of the flexible banner.

These and other objects, features, and advantages of the present invention will be more readily apparent by reference to the following brief description of the drawings and best modes for carrying out the invention. It is to be understood that the drawings and description are for exemplary purposes only and are not intended to and do not limit the scope of the invention as set forth in the accompanying claims.

BEST MODES FOR CARRYING OUT THE INVENTION

Figure 1:
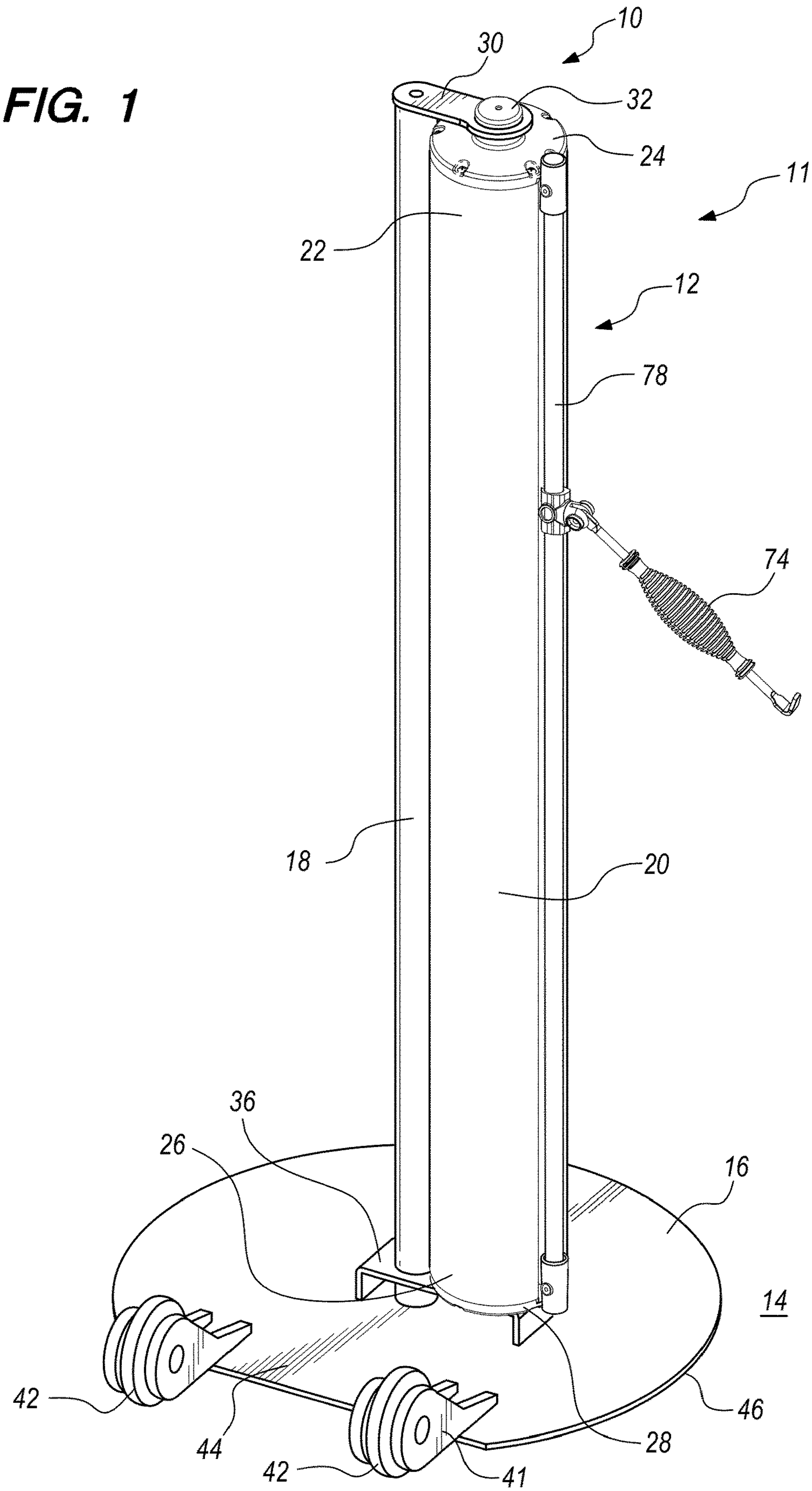
FIG. 1 is a perspective diagram of the portable, non-anchored support structure of the present invention for positioning a retractable banner assembly and selectively deploying the assembly on a walking surface.
Figure 2:
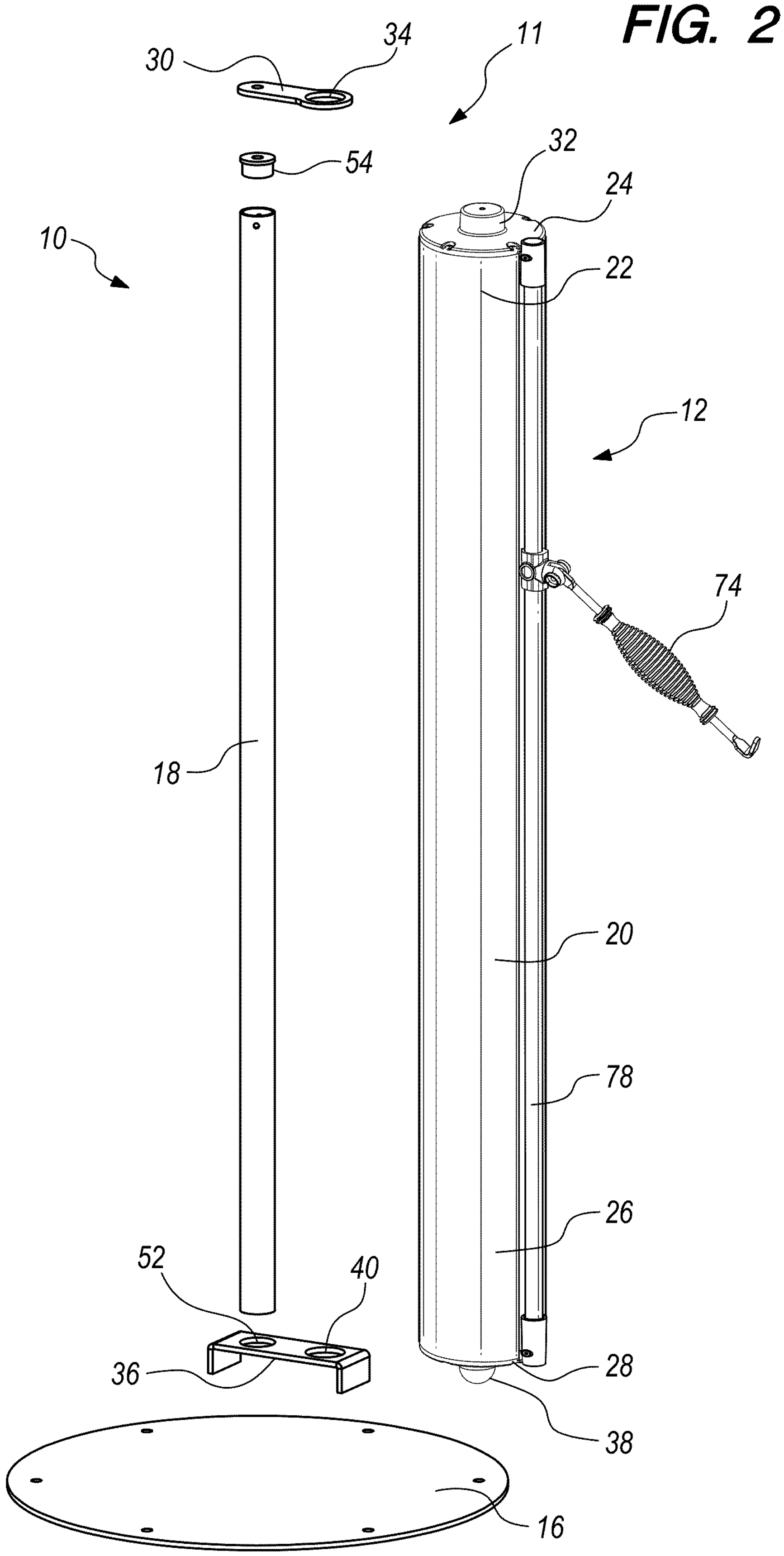
FIG. 2 is an exploded perspective diagram of the components of the non-anchored support structure and retractable banner assembly of FIG. 1.

With reference to FIGS. 1 and 2 of the drawings, there is provided a perspective diagram, and an exploded perspective diagram respectively, of the portable, non-anchored support structure 10 of the present invention for positioning a retractable banner assembly 12 and selectively deploying the assembly on a walking surface 14 in a desired upright position relative thereto. For ease of reference, portable, non-anchored support structure 10 and banner assembly 12 may be collectively referred to as a portable, non-anchored, self-supporting retractable banner stanchion assembly 11 for selective placement by a user on walking surface 14. Still referring to FIGS. 1 and 2, support structure 10 includes a base 16 and a stanchion 18 supported by base 16 in the desired upright position relative to walking surface 14. In a first preferred, but not required embodiment, the desired upright position of stanchion 18 is normal (perpendicular or substantially perpendicular) to walking surface 14. However, it is understood that any suitable orientation may be provided depending on the use and application. In keeping with the invention, stanchion 18 positions retractable banner assembly 12 in a desired upright position which, again, in a first preferred, but not required embodiment, is substantially normal to walking surface 14.

Still referring to FIGS. 1 and 2, in the first preferred, but not required, embodiment shown and described, retractable banner assembly 12 includes a housing 20 having a first end 22, a first end cap 24 affixable to the first end 22, a second end 26, and a second end cap 28 affixable to the second end 26. Support structure 10 further includes a top bracket 30 affixable to stanchion 18 for receiving the first end cap 24 and more specifically first hub 32 within aperture 34 of top bracket 30. Structure 10 further includes a bottom bracket 36 affixable to stanchion 18 and/or base 16 for receiving second end cap 28 and more specifically second hub 38 within aperture 40 of bottom bracket 32. Bottom bracket 36 may be integrally formed with base 16 or may comprise a separate component or assembly affixed or affixable to base 16 by suitable means. Top and bottom brackets 30 and 36 collectively function to dispose housing 12 in the desired upright position here shown as substantially normal to walking surface 14 and further preferably, but not necessarily, permit housing 20 to rotate therein. More specifically, in the preferred, but not required embodiment shown and described in FIGS. 1-2, first and second hubs 32 and 38 of respective first and second end caps 24 and 28 rotate within respective top and bottom bracket apertures 34 and 40. First and second hubs 34 and 38 may be integrally formed with respective first and second end caps 24 and 28, respectively, or may be one or more separate components or assemblies coupled to first and second end caps 24 and 28 by screws, threads, or other suitable means. As readily seen, in most applications, the orientation of first and second housing ends 22 and 26 is interchangeable. That is, first end cap 24 may be coupled to top bracket 30 (first hub 32 received in aperture 34) or bottom bracket 36 (first hub 32 received in aperture 40). Similarly, second end cap 28 may be coupled to bottom bracket 36 (second hub 38 received in aperture 40) or top bracket 30 (second hub 38 received in aperture 34). In a preferred, but not required embodiment, stanchion 18 is received and secured to base 16 by bottom bracket 36 and more specifically received in aperture 52 of bracket 36. It is understood, however, that stanchion 18 may be affixed or affixable to base 16 in a variety of suitable ways, depending on the use and application, including being directly coupled to, within, or through base 16. Stanchion 18 may similarly function to position assembly 12 in a variety of suitable ways including, but not limited to, via top bracket 30 and aperture 34 and bottom bracket 36 and aperture 40.

It is understood that assembly 12 may be positioned and oriented relative to walking surface 14 by stanchion 18 in a variety of ways including by way of example, but not limitation, the above referenced top and bottom brackets 30 and 36, additional brackets (not shown), or even a single bracket that may be affixed or affixable to housing 20 and stanchion 18 and/or base 16 at the discretion of the user. It is also anticipated that in some applications, it may be desirable for stanchion 18 to orient assembly 12 in a variety of positions relative to walking surface 14 including substantially normal thereto as referenced above, substantially parallel thereto, and any and all positions there between. Base 16 may also be provided with one or more devices to assist in the portability of the structure such as swivel or non-swivel caster wheels 42 and the like which are preferably, but not necessarily, disposed on base top side 44. The foregoing placement permits support structure 10 to be tilted back on end at an angle sufficient for caster wheels 42 to engage with the walking surface 14 thereby preventing inadvertent movement of base 16. It is understood, however, that caster wheels 42 may affixed to base 16 at any suitable location including, if desired, on a bottom surface 46 of base 16 in combination with corresponding safety locks 9 (not shown) to similarly prevent undesired or inadvertent movement of support structure 10. Caster wheel side supports 41 may be integrally molded to base 16 or may comprise separate components or assemblies affixed or affixable thereto by suitable means. In an additional preferred, but not required embodiment, shown in FIG. 4, stanchion 18 and/or top bracket 30 of support structure 10 may further comprises a handle 48. Handle 48 may be integrally formed with bracket 30 or affixed thereto and may further include a cut-out portion or other suitable gripping area 50 to permit a user to grab, tilt on end, and pull structure 10 on wheels 42. The foregoing handle and cut-out portion may similarly be provided (but are not shown) in the alternative embodiments of FIGS. 4-7.

Figure 3:
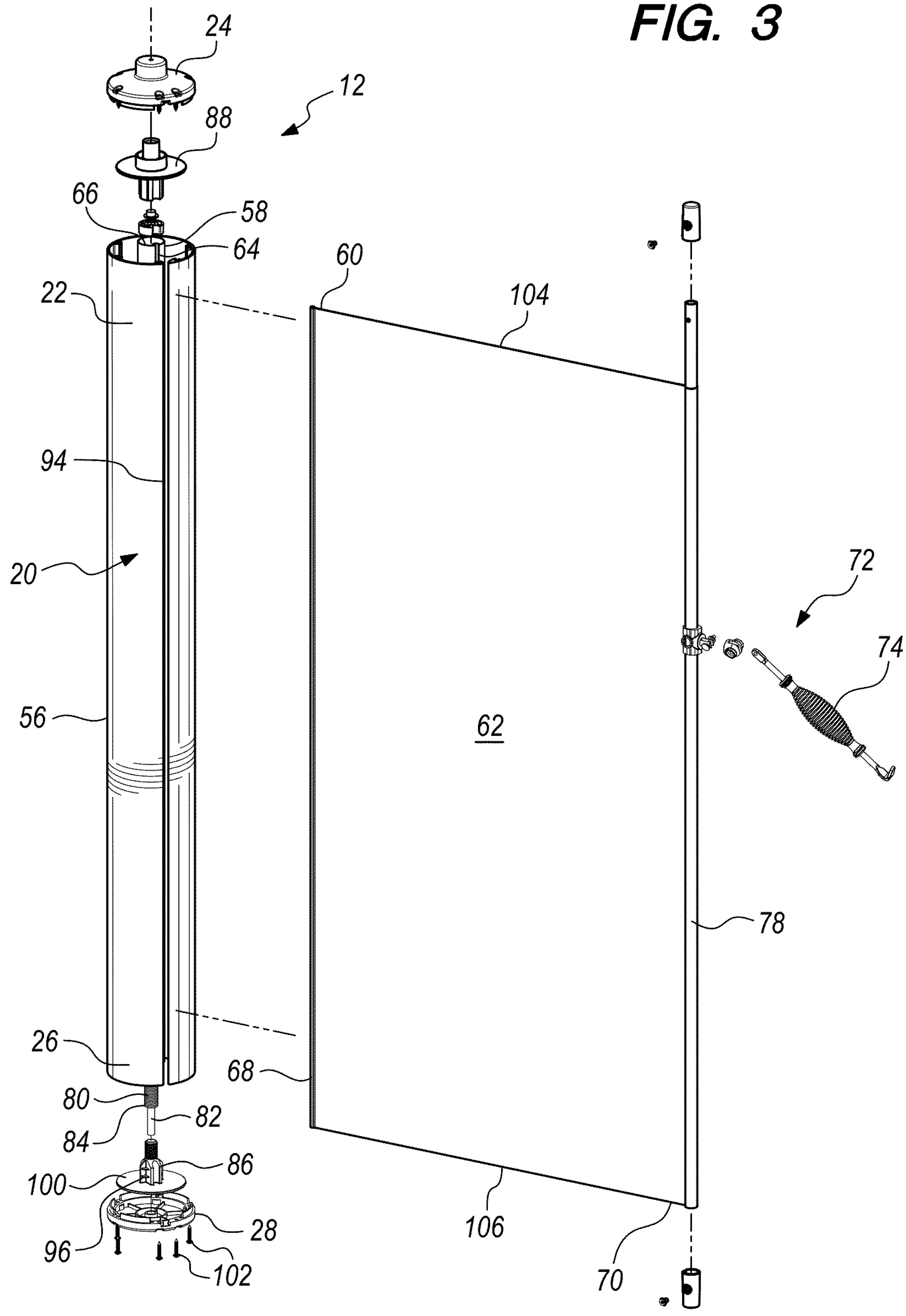
FIG. 3 is an exploded perspective diagram of exemplary internal components of the retractable banner assembly of FIGS. 1 and 2.

Turning now to FIG. 3 of the drawings, the internal components and operation of retractable banner assembly 12 of the present invention will be shown and described in further detail. Assembly 12 comprises a housing 20 having a first end 22, a second opposing end 26, and a sidewall 56 extending therebetween. In keeping with the invention, assembly 12 is intended to be positioned by support structure 10, and more particularly stanchion 18 as referenced above. Assembly 12 is further intended to be coupled to a user-selectable external attachment point including interconnection with one or more additional retractable banner assemblies 12 as discussed further herein to define corresponding pathways for controlling traffic by guiding and routing traffic therethrough, inhibiting ingress to and egress from such defined pathways, and where applicable, providing pre-printed private or public messaging including by way of example and not limitation visual guidance for appropriate or suggested spacing of persons for health or safety.

As further shown in FIGS. 3, housing 20 includes at least a rotatable elongate mounting rod 58 that may be directly or indirectly affixed to a trailing edge 60 of a flexible banner, gate, screen, or the like 62. Mounting rod 58 may comprise any suitable material including, but not limited to, extruded aluminum. The referenced trailing edge 60 of flexible screen 62 may be affixed to mounting rod 58 in any suitable manner. In the preferred but not required embodiment shown, mounting rod 58 is provided with an elongate annular notch 64 that spans a sufficient vertical length of mounting rod 58 such that a concave portion 66 thereof may receive an optional mounting tube 68 affixed to the trailing edge 60 of flexible screen 62. Mounting tube 68 similarly spans a sufficient vertical length of flexible screen 62 and may be affixed thereto by any suitable means including adhesive. As shown, mounting tube 68 may be inserted into the concave notch portion 66 of mounting rod 58 to secure flexible screen 62 to mounting rod 58. Screen 62 may thereafter be wound about mounting rod 58 as will be discussed in further detail below. Again, mounting tube 68 may comprise any suitable material and may be affixed to the trailing edge 60 of flexible screen 62 in any suitable manner including, but not limited to, mechanical attachment, adhesive, or melting/fusing the components together. In the latter case, mounting tube 68 may be comprised of plastic or other material capable of being adhered to flexible screen 62 by applying heat and/or pressure, or the like.

Flexible banner 62 may similarly comprise or include any suitable material or fiber including cloth, canvas, plastic, wire, paper, netting, and the like, or any combination thereof that may be readily and easily retracted about mounting rod 58 when the flexible banner 62 is disengaged, and extended therefrom when the banner 62 is intended to be engaged as necessary to span or define an entryway, queue, or other designated private or public area whether indoors or outdoors, including as referenced above, to be interconnected to a secondary retractable banner assembly to define a pathway there between. Flexible banner 62, by nature of its unitary, flexible, and retractable design and size, is also amenable to having pre-printed wording or signage placed thereon including of any suitable nature and provided for display at a plurality of extension or recoil positions depending on the placement distance from a secondary retractable assembly or other retention member. For example, such wording or signage may be placed at or near a leading edge 70 of flexible banner 62 for intended display when banner 62 is partially extended, at or near trailing end 60 for intended display when banner 62 is fully extended, or anywhere there between, depending on the positioning. Such wording or signage may also be printed on opposing sides of the banner 62 and positioned thereon at any suitable location to prevent ink seepage or message interference, depending on the translucency and type of barrier material being used. Still further, banner 62 may be printed with appropriate markings or messaging to provide visual guidance to persons including by way of example and not limitation, regarding suggested or required standing positions in accordance with applicable community standards, laws, or regulations relating to social distancing for health or safety purposes.

Still referring to FIG. 3, in this exemplary application, flexible banner 62 is further provided with an attachment assembly 72 operative to couple a leading edge 70 of banner 62 to an external attachment point as reference above. Attachment assembly 72 may comprise any suitable components and construction including a hooking arm 74 that is fully rotatable in both the vertical and horizontal direction as shown or one or more removably inter-lockable bracket members, and the like, that may be affixed at top and/or bottom ends of the leading edge 70 or anywhere there between of banner 62 for receipt by corresponding receiving bracket members at the external attachment point. As shown, attachment mechanism 70, here hooking arm 74 may also be affixed to an attachment rod or pull member 78. Pull member 78 may further be affixed to leading edge 70 of flexible screen 62 by any suitable means, including adhesive. It is understood, however, that pull member 78 is provided in a preferred embodiment only and may be eliminated or modified without departing from the spirit or scope of the invention herein described.

A winding mechanism such as a conventional spring or, more preferably, but not necessarily, a torsion spring 80, is further provided as shown in FIG. 3. As those skilled in the art will recognize, torsion springs are typically helical springs that function to exert a torque or rotary force. When twisted, a torsion spring thus exerts a force, actually torque, in the opposite direction that is proportional to the amount (angle) it is twisted. Characteristically, the respective ends of a torsion spring are attached to other components, and when those components rotate around the center of the spring, the spring exerts a counter-force in attempt to push the components back to their original position. While the name implies otherwise, so-called torsion springs are actually subjected to bending stress rather than torsional stress. In operation, such springs function to store and subsequently release substantial angular energy (mechanical energy) or statically hold a mechanism in place by deflecting the legs about a body centerline axis.

In the exemplary embodiment shown, torsion spring 80 is coupled at a top end thereof to a shaft 82 and more particularly to a shaft slot. It is understood, however, that torsion spring 80 may of course be affixed and secured at its top end to shaft 82 by any suitable means including, but not limited to, the above-described shaft slot. Torsion spring 80 is further affixed at a bottom end 84 thereof to a bottom key or winding key 86. In keeping with the invention and the preferred embodiment shown and described, bottom key 86 freely rotates about a center axis of shaft 82 and functions to wind or "pre-load" torque onto torsion spring 80 prior to insertion into mounting rod 58 (and wound banner 62) as will be described in further detail below. There is also provided a top key 88 positioned at and affixed to the top end of shaft 82. Like bottom key 86, top key 88 freely rotates about shaft 82, and more particularly, about the top end of shaft 82. Top key 88 is secured from removal from shaft 82 by a roll pin or other suitable retention member received within corresponding apertures of shaft 82 and top key 88. Again, it is understood that any suitable means may be used to secure top key 88 from removal. Notably, top key 88 is not affixed to torsion spring 80. Rather, top key 88 includes an annular notch that functions to guide the assembly (torsion spring 80 and shaft 82) into mounting rod 58. More specifically, a concave portion of a top key annular notch is received by a convex portion of a corresponding mounting rod annular notch, as will be described in further detail below.

Still referring to FIG. 3, the exemplary, but not required, embodiment shown and described includes top and bottom end caps 24 and 28, respectively, removably affixable to housing 20. Again, the foregoing may comprise any suitable material including plastic, molded unitary aluminum, cast aluminum, extruded aluminum, and the like. In the preferred embodiment shown, top and bottom caps 24 and 28, also called top and bottom base caps, preferably, but not necessarily comprise cast aluminum, and housing 20 preferably, but not necessarily, comprises extruded aluminum. Bottom base cap 28 is affixed to shaft 82 in any suitable manner, including, for example by receiving shaft 82 within a receiving notch, aperture, or extension portion affixed to or molded within bottom cap 28 and securing the same with a roll pin or other suitable retention member so that shaft 82 is secured and oriented so it can't move. Once secured, bottom base cap 28 will rotate with shaft 82. Accordingly, once torsion spring 80 (affixed to shaft 82) is preloaded with torque to store mechanical energy, bottom cap 28 must be secured in place to prevent release of such energy. Housing 20 further defines an internal cavity and includes an elongate vertically disposed opening 94 or slot for receiving and extending banner 62 through the housing 20 once assembled. As illustrated, in this preferred embodiment housing 20 is substantially rounded extending contiguously about a radius of three hundred and sixty degrees. It is understood, however, that any suitable shape, configuration, and/or orientation, including one or more additional sidewalls of varying shape, may be utilized without departing from the spirit, scope, and functionality of the disclosed invention.

As discussed in substantial more detail in the co-pending patent applications referenced above, the disclosures of which are fully incorporated herein by reference, the steps for preloading spring 80 with suitable torque are described. Accordingly, spring tension is first applied by rotating or winding base key (winding key) 86. While holding bottom or base cap 28 securely in place (as it is affixed to shaft 82), the entire assembly is inserted into mounting rod 58 using top key 88 and more particularly a top key notch as a guide for receipt by a corresponding annular notch and more particularly a convex portion thereof. Winding key 86 is thereafter secured in place similarly by mating adjacent ridges 96 with the same convex portion of the annular notch. Thereafter, bottom cap 28 is secured to second end 26 of housing 20 using any suitable fastener or fasteners such as screws 102 or the like. Top cap 24 is similarly secured to first end 22 of housing 20 in like manner. Top cap 24 includes a guide similarly having an annular notch. The guide functions to freely rotate within top cap 24. Specifically, the annular notch receives and mates with a corresponding mounting rod notch and more specifically a convex portion thereof. Accordingly, mounting rod 54 may freely rotate within housing 20 about top and bottom caps 24 and 28, respectively. More specifically, top end of mounting rod 58 rotates about a guide and bottom end 84 of mounting rod 58 rotates about bottom key 86 with preloaded torque applied thereto.

Still referring to FIG. 3, in a preferred embodiment, bottom winding key 86 may further include a guide member 100 comprising a separate component that may be coupled by any suitable means to a bottom surface of bottom winding key 86 or a top surface or lip of bottom winding key 86. In the latter case, guide member 100 may include one or more apertures or cut out portions as necessary to slide or otherwise fit over shaft 82 and torsion spring 80. Alternatively, guide member 100 may be integrally formed with bottom winding key 86 as shown in FIG. 3. Guide member 100 may comprise any suitable and preferably substantially rigid material including, but not limited to plastic, and is preferably, but not necessarily disk-shaped. It is understood, however, that any suitable size or shape may be utilized provided the objectives below are achieved. Guide member 100 may also be affixed to bottom key 86 in any suitable manner including, but not limited to, adhesive, screws or bolts, or other fastener or fastening means, or may be integrally molded therewith. In keeping with the invention, guide member 100 includes a surface portion having a sufficient diameter and oriented substantially perpendicular or normal to the flexible banner 62 to guide and promote substantially smooth extension and retraction of the banner 62 (i.e. inhibit binding or "bunching up") thus permitting the use of flexible screens comprising a greater array of materials and textures including those having a more "tacky" or "rubbery" composition, texture or feel. Again, substantial additional detail illustrating the foregoing is provided in the co-pending patent applications referenced above, the disclosures of which are fully incorporated herein by reference.

In further preferred, but not required embodiment, flexible banner 62 may be cut tapered in height from the leading edge 70 to the trailing edge 60 thereof, so as to further assist in promoting the smooth retraction and extension of flexible banner 62. In such case, leading edge 70 may have a height that is greater than the height of the trailing edge 60 with the above-referenced tapering there between preferably, but not necessarily, in equal amounts at both the top and bottom portions of the trailing edge 60. The specific tapering, amount, and location thereof will depend in large part on the relative heights of the respective leading and trailing edges, the length or span of the flexible banner 62, the selected banner material, materials or composite construction, the corresponding modulus of elasticity of the foregoing, the resulting flexibility or "pliability" thereof, as well as the specific application. By way of example, but not limitation, leading edge 70 may have an exemplary height of 40 inches, the flexible banner 62 may have a length or span of 6 feet, and the trailing edge 56 may be tapered equally a half inch at both the top and bottom portions thereof defining a trailing edge height of 39 inches. Of course, greater or less tapering as well as different tapering locations (including at the leading edge 70, the trailing edge 60, or both edges) and patterns may be employed to achieve different results and will provide different corresponding appearances of the flexible banner 62 upon being installed and extended. The above referenced tapering amounts and location are provided as exemplary of a preferred embodiment only wherein minimal tapering has been provided to achieve the objective of inhibiting binding or bunching up of the gate upon retraction and/or extension without substantially altering the appearance of the flexible banner 62 once extended (i.e. to appear upon casual inspection to have a uniform or near uniform height across the length or span of banner 62 once extended). Different tapering amounts and locations are thus anticipated depending on the application and desired performance (required flexibility or alternatively the lack of rigidity) and appearance of banner 62.

As those skilled in the art will recognize, and as referenced above, the rigidity of the material of banner 62 may more properly be referred to as its elastic modulus also known as its modulus of elasticity. Practically speaking, elastic modulus is not the same as stiffness. Elastic modulus is a property of the constituent material; stiffness is a property of a structure. Accordingly, modulus of elasticity is an intrinsic property of the material, whereas stiffness is an extrinsic property of a body dependent on the material and the shape of the boundary conditions. Modulus of elasticity is thus a prime property to be considered when selecting the above referenced screen material to achieve the desired stiffness of the resulting screen. In short, the modulus of elasticity must be sufficiently low to provide the required flexibility yet sufficiently high to inhibit or obviate undesirable binding or "bunching up" of the screen that might otherwise result particularly during retraction. More specifically, and in keeping with the invention herein, the modulus of elasticity of the screen material or materials must be sufficiently high such that the screen has sufficient stiffness to inhibit sagging or bowing of the same upon extension thus promoting the smooth retraction thereof by conversely obviating potential binding or bunching up of the screen which might otherwise result during retraction. In summary, the selected material must permit high cycle use (i.e. frequent extension and retraction), exhibit low or no creasing resulting from such cycling, exhibit low no curling along top and/or bottom edges 104 and 106 upon extension as well as low or no rippling in the are there between, and be vertically resilient to prevent pluming. In a preferred, but not required embodiment, a PET material may be utilized. Alternatively, or in addition thereto, monofilaments may be used with a warp knit. Specifically, the monofilaments may be disposed in the weft or vertical direction of banner 62 add stiffness and durability and multifilament PET yarns may be disposed in the warp or horizontal direction of banner 62. A PVC film may thereafter be laminated on both sides of banner 62 to seal knit and create printable surfaces.

In further keeping with the invention, a variety of spacers may also be provided to reduce friction between guide member 100 and bottom cap 28. More specifically, such spacers may be provided to reduce friction between a bottom surface of guide member 100 and top surface of bottom cap 100. The use, design and placement of such spacers is again discussed in substantial more detail in the above-referenced co-pending patent applications, the disclosures of which are fully incorporated herein by reference. Accordingly, a variety of spacers may be provided to reduce or eliminate such friction. Such spacers may comprise an additional disk having any suitable composition, rigidity, orientation, and dimension and may also comprise one or more raised portions such as buttons, nubs, ridges, or the like, coupled to or formed integral with either or both of the relative contacting surfaces.

In yet a further preferred embodiment provided to achieve the desired performance above, one or more support members may also be coupled to flexible banner 62 at suitable locations to enhance the stiffness/rigidity of the banner 62, particularly, but not necessarily, limited to the vertical direction, beyond that of the elastic modulus of the selected screen material. By way of example, but not limitation, one or more flexible battens or the like comprising fiberglass, plastic, rubber, wire, or any suitable material or composition, including any combination of the foregoing, may be coupled to banner 62, again preferably, but not necessarily in the vertical direction, including for example, but not limitation, by insertion into one or more predefined receiving receptacles such as batten pockets commonly used in sails. The foregoing battens may be coupled or placed at any suitable location and orientation including along any portion or the entire span of the top and/or bottom edges and/or the leading or trailing edges of banner 62 or anywhere there between, including extending inward at any angle from any such edge.

Figure 4:
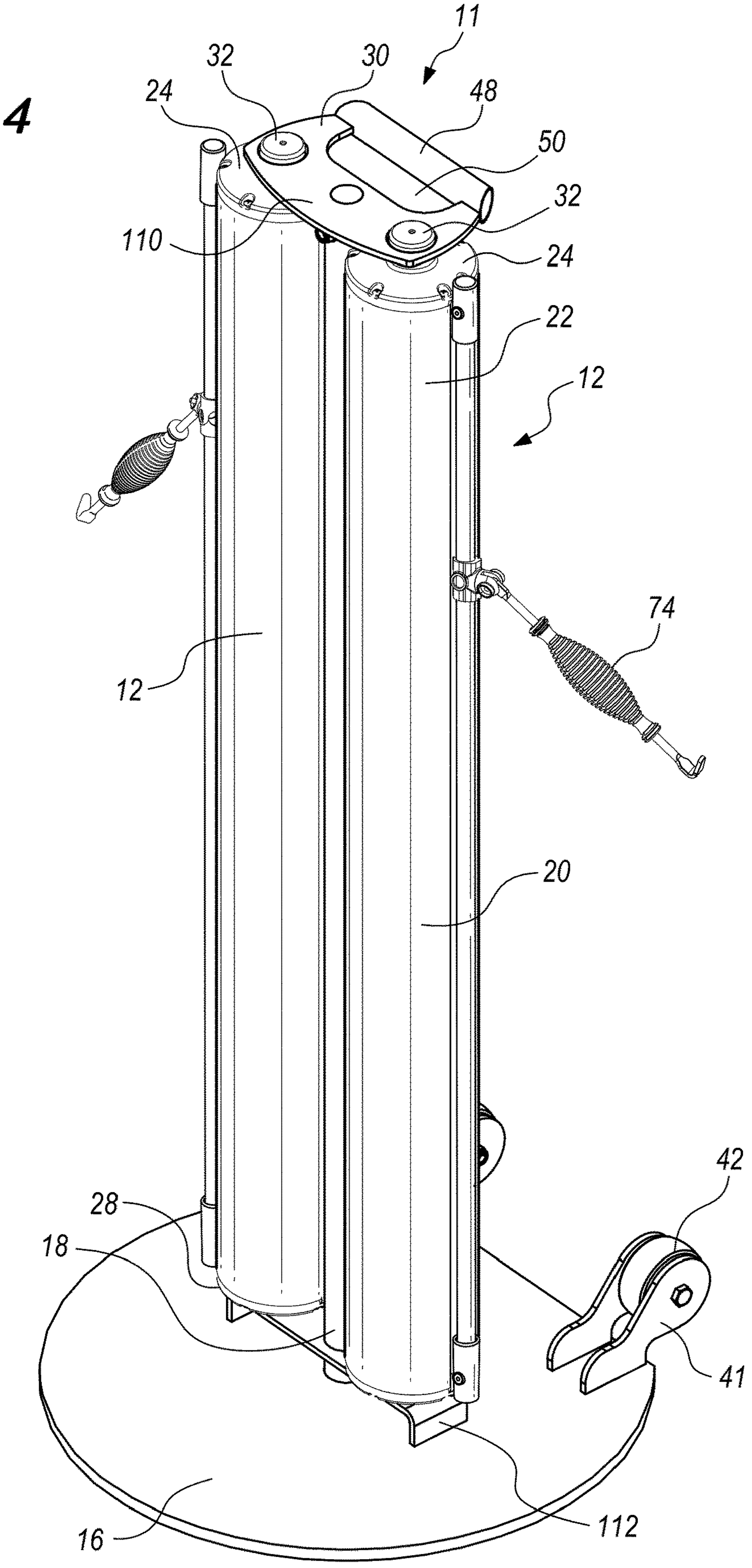
FIG. 4 is a perspective diagram of a first alternative embodiment of the portable, non-anchored support structure of the present invention for positioning a plurality of retractable banner assemblies and selectively deploying the assemblies on a walking surface.
Figure 5:
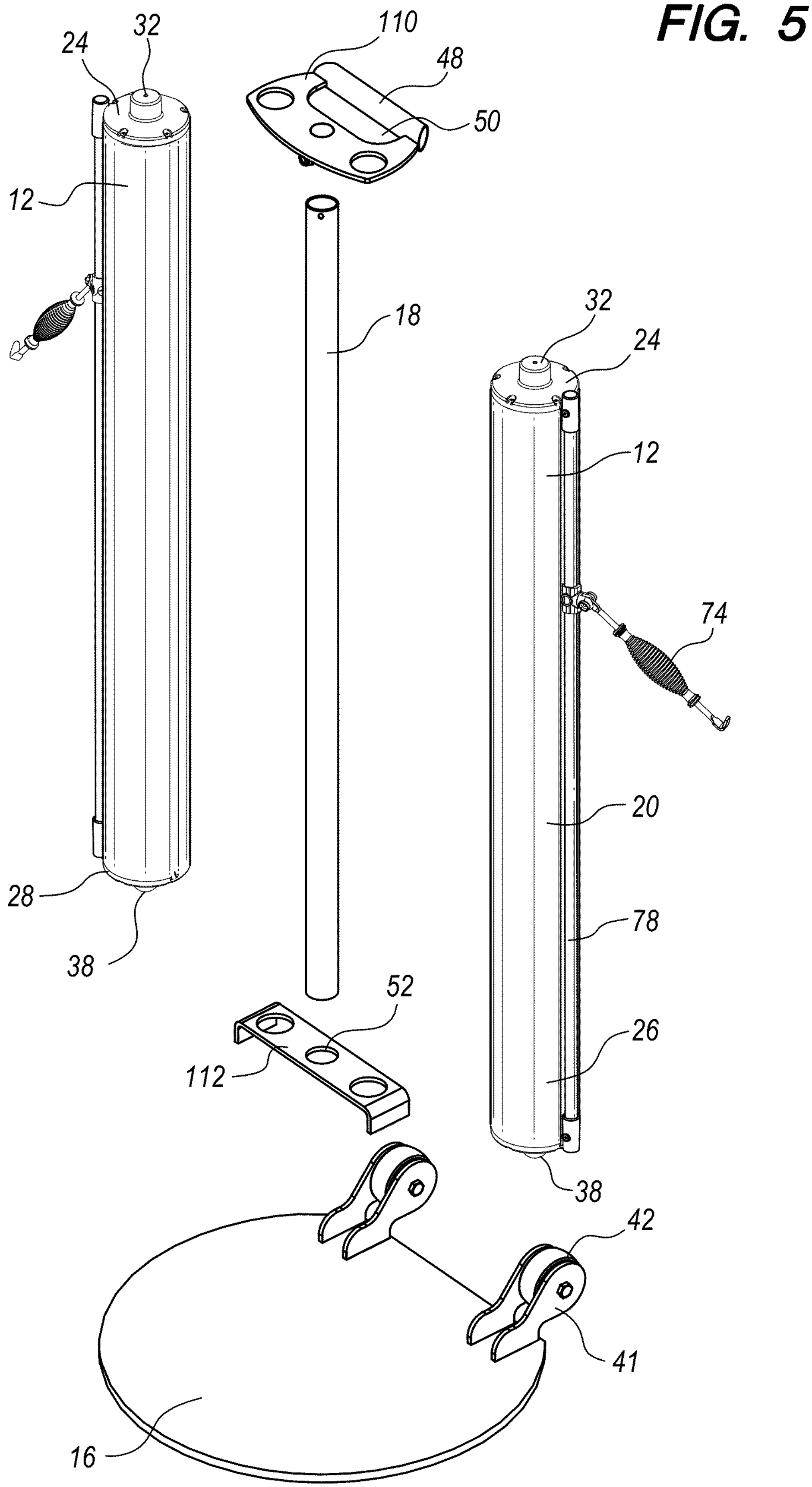
FIG. 5 is an exploded perspective diagram of the components of the non-anchored support structure and retractable banner assemblies of FIG. 4.
Figure 6:
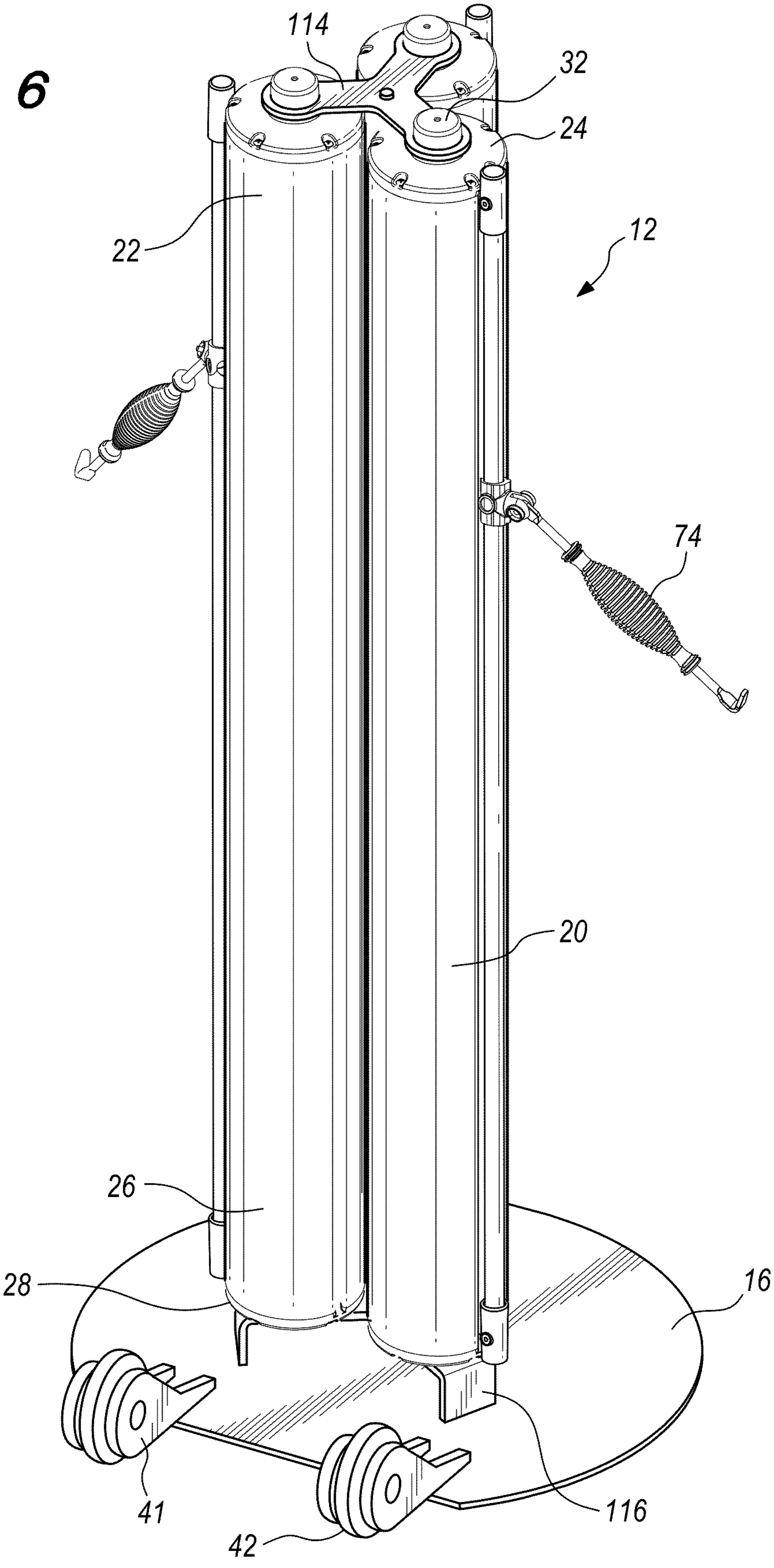
FIG. 6 is a perspective diagram of a second alternative embodiment of the portable, non-anchored support structure of the present invention for positioning a plurality of retractable banner assemblies and selectively deploying the assemblies on a walking surface.
Figure 7:
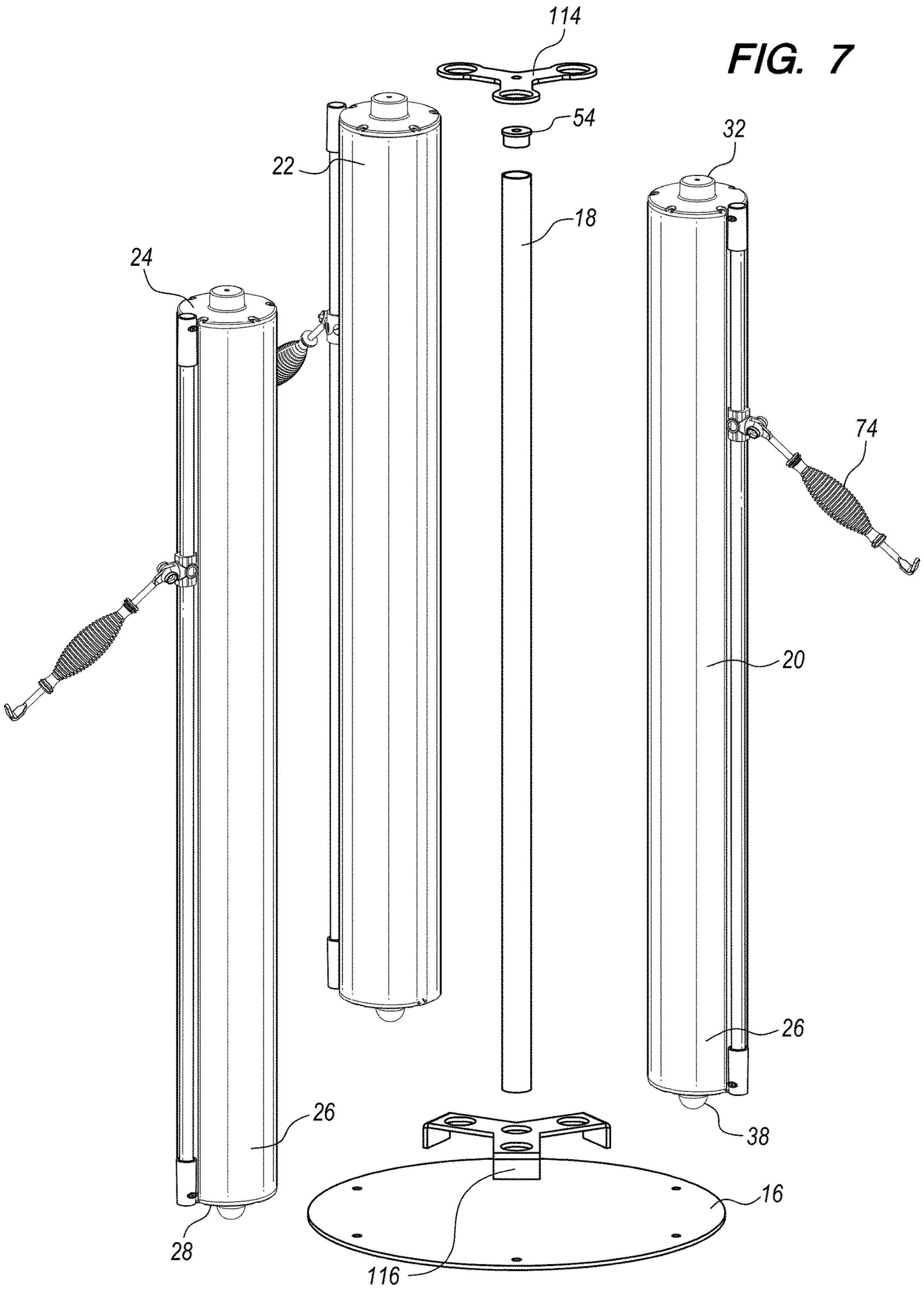
FIG. 7 is an exploded perspective diagram of the components of the non-anchored support structure and retractable banner assemblies of FIG. 6.
Figure 8:
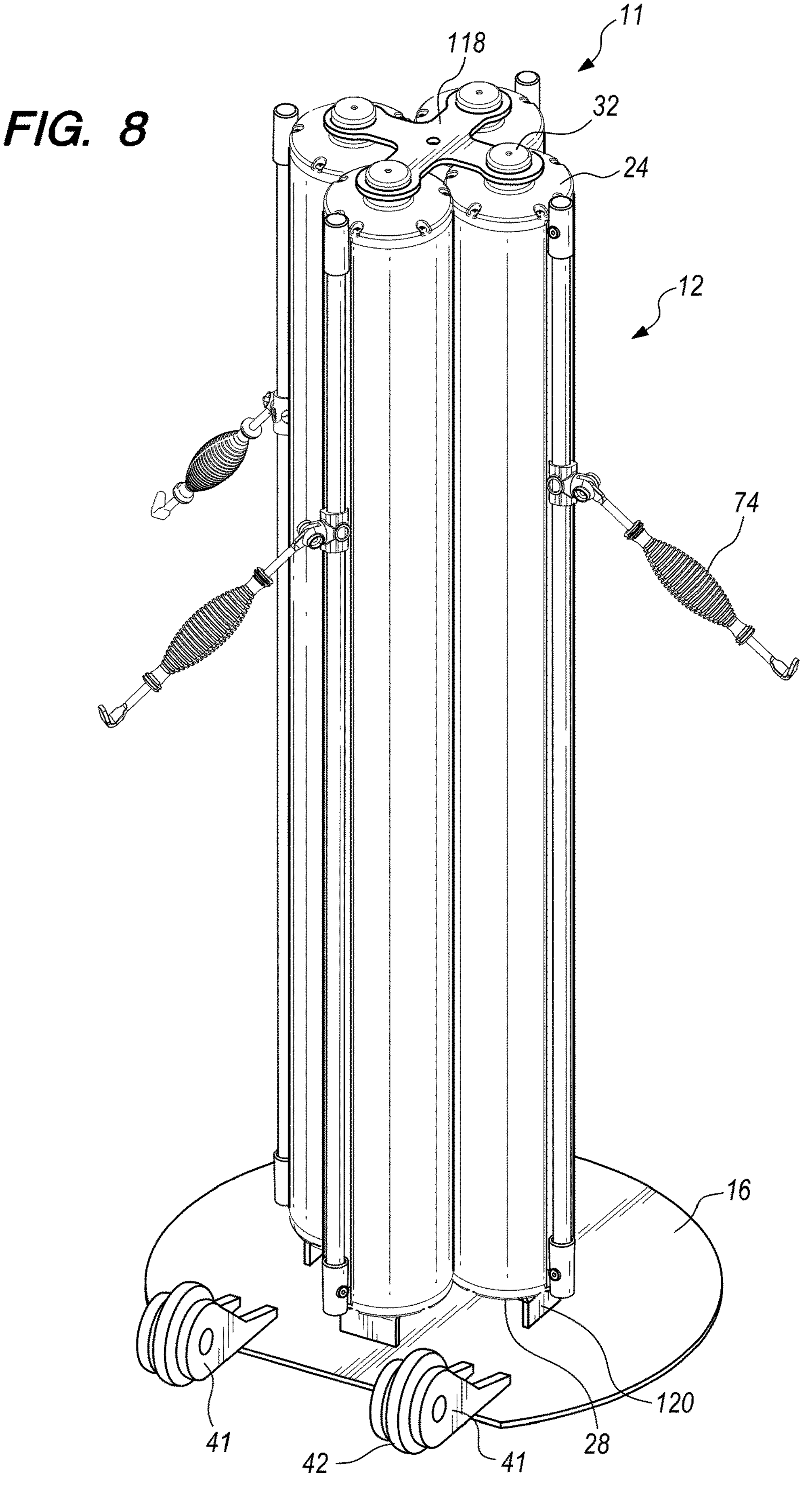
FIG. 8 is a perspective diagram of a third alternative embodiment of the portable, non-anchored support structure of the present invention for positioning a plurality of retractable banner assemblies and selectively deploying the assemblies on a walking surface.
Figure 9:
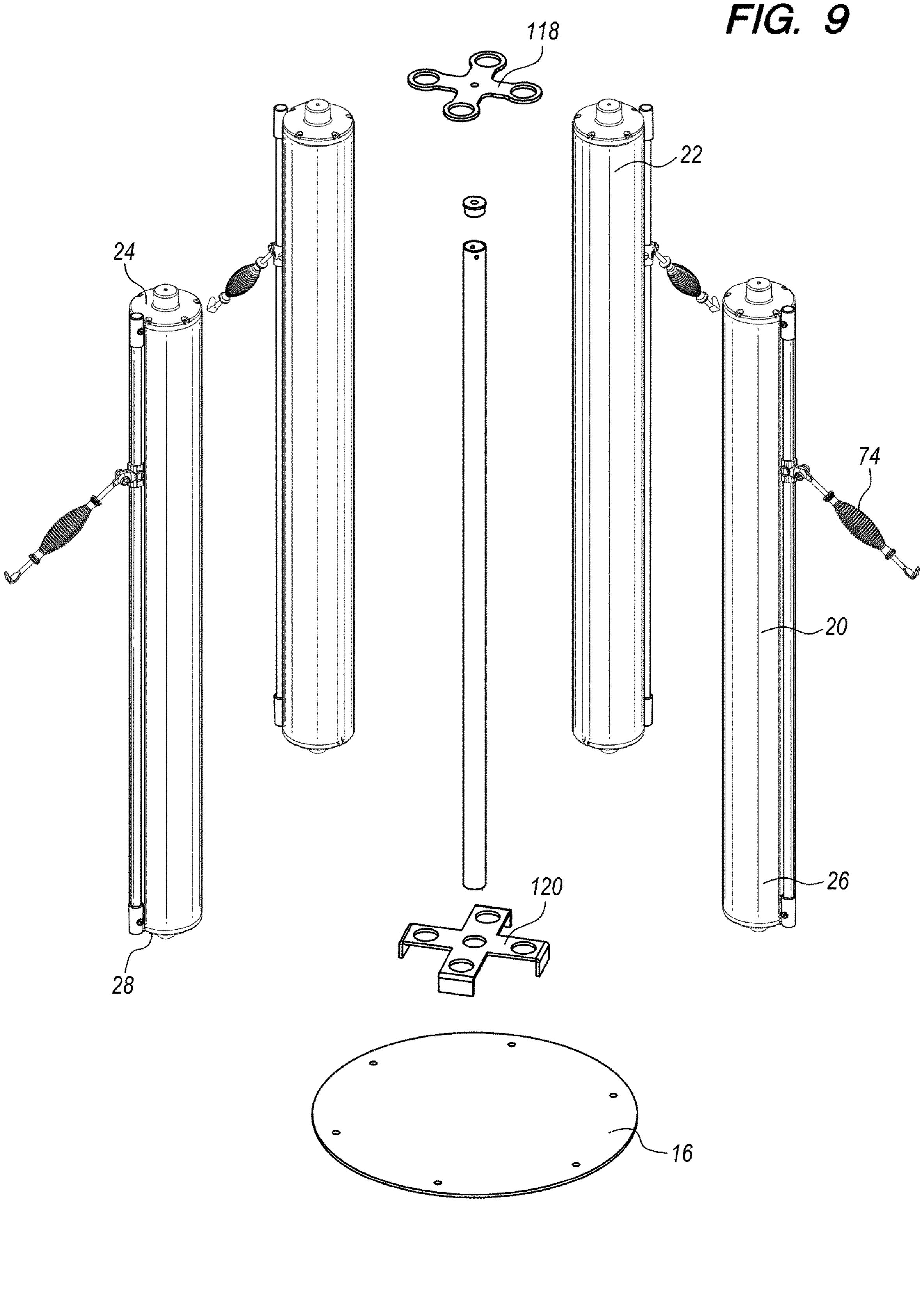
FIG. 9 is an exploded perspective diagram of the components of the portable, non-anchored support structure and retractable banner assemblies of FIG. 8

With reference to FIGS. 4 through 9 of the drawings, support structure 10 of the present invention is shown in various alternative embodiments supporting a plurality of retractable banner assemblies 12. Support structure 10 is similar in each embodiment except for the corresponding top and bottom brackets which are adapted to receive, retain, and in respective preferred, but not required embodiments, permit rotation of the corresponding plurality of banner assemblies 12. Accordingly, dual banner assembly top and bottom brackets 110 and 112 are shown in FIGS. 4 and 5, tri-banner assembly top and bottom brackets 114 and 116 are shown in FIGS. 6 and 7, and quad-banner assembly top and bottom brackets 118 and 120 are shown in FIGS. 8 and 9, respectively. It is appreciated that any number of banner assemblies may be accommodated by corresponding top and bottom brackets according to the present invention. The foregoing single, dual, triple and quad banner assemblies are thus shown for exemplary purposes only, and not limitation. In each of the alternative embodiments, any or all of the retractable banner assemblies 12 may be rotatable, including, but not limited to, in the manner herein described by top and bottom hubs 32 and 38 within receiving apertures of the corresponding top and bottom retaining brackets or other suitable manner.

While embodiments of the invention have been illustrated and described, it is not intended that these embodiments illustrate and describe all possible forms of the invention. Rather, the words used in the specification are words of description rather than limitation, and it is understood that various changes may be made, and equivalent structures, features, and functions may be provided, without departing from the spirit and scope of the invention.

What is claimed is:

1. A retractable banner assembly, comprising:

an elongated housing having a slot;

no more than one mounting rod disposed within the housing and rotatably coupled thereto;

a rollable banner having a trailing edge coupled with the mounting rod and extending substantially along the length of the housing, a leading edge extending substantially along the length of the housing, and a bottom edge extending between the trailing edge and the leading edge, wherein the banner is extensible and retractable through the slot in the housing; and a positioning assembly disposed external to the housing and extending at least partially along the length of the housing, the positioning assembly oriented in an approximately vertical position relative to a walking surface and coupled with the housing, thereby orienting the housing in an approximately vertical position relative to the walking surface;

wherein the housing freely rotates relative to the positioning assembly to allow for multi-directional deployment of the banner, and upon each such deployment of the banner, the bottom edge is positioned in substantial proximity to the walking surface.

2. The retractable banner assembly of claim 1, wherein the positioning assembly extends substantially along the length of the housing.

* * * * *